(12) United States Patent
Li et al.

(10) Patent No.: US 7,620,123 B2
(45) Date of Patent: *Nov. 17, 2009

(54) RECEIVER FOR ESTIMATING SIGNAL MAGNITUDE, NOISE POWER, AND SIGNAL-TO-NOISE RATIO OF RECEIVED SIGNALS

(75) Inventors: Bin Li, Shenzhen (CN); Gregory S. Sternberg, Mt. Laurel, NJ (US); Philip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/166,702

(22) Filed: Jul. 2, 2008

(65) Prior Publication Data
US 2008/0298508 A1   Dec. 4, 2008

Related U.S. Application Data

(63) Continuation of application No. 10/750,203, filed on Dec. 31, 2003, now Pat. No. 7,502,426.

(60) Provisional application No. 60/501,302, filed on Sep. 9, 2003.

(51) Int. Cl.
*H03D 1/24* (2006.01)
(52) U.S. Cl. ..................................................... 375/320
(58) Field of Classification Search ................. 375/261, 375/298, 316, 320; 332/103, 120, 149, 150; 370/207; 329/304, 347, 348, 349
See application file for complete search history.

(56) References Cited

U.S. PATENT DOCUMENTS 4,775,988 A   10/1988   Chevillat (Continued)

FOREIGN PATENT DOCUMENTS

EP   0 211 995   3/1987

(Continued)

OTHER PUBLICATIONS

Tarokh, Beeta et al. "Construction of OFDM *M*-QAM Sequences With Low Peak-to-Average Power Ratio", Jan. 2003, IEEE Transactions on Communications, vol. 51, No. 1, pp. 25-28.

(Continued)

*Primary Examiner*—Sam K Ahn
(74) *Attorney, Agent, or Firm*—Volpe and Koenig, P.C.

(57) ABSTRACT

An improved receiver and method estimate one or more parameters, such as amplitude and signal-to-noise ratio, of a received signal, such as an M-QAM or q-ASK signal. The amplitude of an M-QAM signal is estimated based upon known or ascertainable phase information regarding a plurality of transmitted symbols. The amplitude of a q-ASK signal is estimated based upon known or ascertainable magnitude information regarding a plurality of transmitted symbols. In another embodiment, the amplitude of an M-QAM or q-ASK signal is estimated based on statistical knowledge of the amplitude of the transmitted symbols. Other embodiments estimate amplitude, noise power, and signal-to-noise ratio of a received signal utilizing second-order and fourth-order moments of received samples, a maximum likelihood searching process, or a Kurtosis estimation process.

16 Claims, 8 Drawing Sheets

U.S. PATENT DOCUMENTS

| | | |
|---|---|---|
| 5,867,478 A | 2/1999 | Baum et al. |
| 6,044,111 A | 3/2000 | Meyer et al. |
| 6,704,353 B1 | 3/2004 | McCarty et al. |
| 7,154,966 B2 | 12/2006 | Malm et al. |
| 2002/0150187 A1 | 10/2002 | Chugg et al. |
| 2004/0096007 A1 | 5/2004 | Aue et al. |
| 2004/0264589 A1 | 12/2004 | Kenney et al. |
| 2004/0264590 A1 | 12/2004 | Kenney et al. |

FOREIGN PATENT DOCUMENTS

| | | |
|---|---|---|
| JP | 06-224953 | 8/1994 |
| JP | 07-38615 | 2/1995 |
| JP | 2003-338851 | 11/2003 |
| WO | 00/64061 | 10/2000 |

OTHER PUBLICATIONS

Tang, Xiaoyi et al. "Effect of Channel Estimation Error on M-QAM BER Performance in Rayleigh Fading", Dec. 1999, IEEE Transactions on Communications, vol. 47, No. 12, pp. 1856-1854.

Kalet, Irving et al. "QAM Transmission Through a Companding Channel —Signal Constellations and Detection", Apr. 1994, IEEE Transactions of Communications, vol. 42, No. 2/3/4, pp. 417-429.

Zook, David M. et al. "Adaptive Wireless Communication Signaling Algorithms For Differential Amplitude Phase Shift Keying In Fading Channels", 2001, IEEE, pp. 118-122.

700

701 — DETERMINE SECOND-ORDER AND FOURTH-ORDER MOMENTS OF A SET OF RECEIVED SAMPLES ($r_k$). THE SECOND-ORDER MOMENT IS DEFINED AS $E\{|r_k|^2\} = E\{|n_k|^2\} + E\{|d_k|^2\}$, AND THE FOURTH-ORDER MOMENT IS DEFINED AS $E\{|r_k|^4\} = E\{|n_k|^4\} + E\{|d_k|^4\} + E\{|n_k|^2\}E\{|d_k|^2\}$, WHERE $d_k$ DENOTES THE TRANSMITTED SYMBOLS AND $n_k$ DENOTES A NOISE COMPONENT THAT IS RECOVERED WITH THE RECEIVED SAMPLES $r_k$.

703 — DIVIDE THE FOURTH-ORDER MOMENT BT THE SECOND-ORDER MOMENT SO AS TO IMPLEMENT A KURTOSIS OPERATION AS FOLLOWS:

$$\mathrm{Kurt}(r) \equiv \frac{E\{|r_k|^4\}}{E\{|r_k|^2\}^2} = \frac{E\{|d_k|^4\} + E\{|n_k|^4\} + 4E\{|d_k|^2\}E\{|n_k|^2\}}{E\{|d_k|^2\}^2 + E\{|n_k|^2\}^2 + 2E\{|d_k|^2\}E\{|n_k|^2\}}$$

THE FOREGOING EXPRESSION FOR KURTOSIS INCLUDES A FIRST KUROSIS COMPONENT ATTRIBUTABLE TO THE RECEIVED SIGNAL, AND A SECOND KUROSIS COMPONENT CORRESPONDING TO THE RECEIVED NOISE.

705 — DETERMINE THE SECOND COMPONENT OF KURTOSIS, CORRESPONDING TO RECEIVED NOISE, AS FOLLOWS: ASSUMING THE EXISTENCE OF COMPLEX CIRCULARLY SYMMETRIC GAUSSIAN NOISE, THE KUROSIS OF THE NOISE COMPONENT ALONE IS $$K_{CG} \equiv \frac{E\{|n_k|^4\}}{E\{|n_k|^2\}^2} = 2.$$

707 — DETERMINE THE FIRST COMPONENT OF KURTOSIS, CORRESPONDING TO THE SIGNAL, ($K_{sig}$), AS $$K_{sig} \equiv \frac{E\{|d_k|^4\}}{E\{|d_k|^2\}^2}.$$

IN THE CASE OF AN M-QAM SIGNAL, $K_{sig}$ IS DENOTED AS $K_{M\text{-}QAM}$.

A → TO FIG. 7B, BLOCK 709

*FIG. 7A*

RECEIVER FOR ESTIMATING SIGNAL MAGNITUDE, NOISE POWER, AND SIGNAL-TO-NOISE RATIO OF RECEIVED SIGNALS

CROSS REFERENCE TO RELATED APPLICATION(S)

This application is a continuation of nonprovisional U.S. patent application Ser. No. 10/750,203, filed Dec. 31, 2003, now issued as U.S. Pat. No. 7,502,426 which claims priority from provisional U.S. Application, Ser. No. 60/501,302, filed Sep. 9, 2003, which are incorporated by reference as if fully set forth.

FIELD OF INVENTION

The present invention relates generally to communication systems and techniques which employ quadrature amplitude modulation (QAM). More specifically, the present invention relates to techniques for accurately demodulating an M-ary QAM signal at a receiver.

BACKGROUND

At present, M-ary QAM (M-QAM) is used to provide high-speed data transfer in conjunction with a number of mobile data communication applications. However, a primary drawback of M-QAM is its computational complexity. One prior art approach for addressing this shortcoming involves the use of square M-QAM constellations, such as 16QAM, 64QAM, and 256QAM. Square constellations may be conceptualized as including two independent q-ary amplitude shift keying (q-ASK) modulation signals as real and imaginary parts (in-phase and quadrature-phase components of a modulated carrier), where $q=\sqrt{M}$.

For example, a 16-QAM signal includes two independent real and imaginary 4-ASK signals. A q-ASK signal takes on values selected from the set $$\left\{\pm\frac{1}{2}, \pm\frac{3}{2}, \ldots, \pm\frac{q-1}{2}\right\}.$$

Representing a square-constellation M-QAM signal in q-ASK format is usually preferred because the complexity of processing a q-ASK signal is significantly less than that of processing a general M-QAM signal.

A received M-QAM signal ($r_k$) may be represented by the following expression:

$$r_k = A^* d_k + n_k;  \qquad \text{Equation (1)}$$

where A is the signal amplitude; $d_k$ represents a set of data symbols encoded onto a transmitted M-QAM or q-ASK signal; and $n_k$ represents noise. While for M-QAM signals, $d_k$ and $n_k$ are complex quantities, for q-ASK signals they are both purely real.

In order to demodulate M-QAM and q-ASK signals, it is necessary to determine the values of one or more signal parameters at the receiver, such as amplitude, noise power, and signal-to-noise ratio (SNR). Even in the case of a q-ASK signal representation, which provides enhanced computational simplicity relative to M-QAM representation, existing techniques for estimating these signal parameters are inefficient and computationally complex.

An improved technique for estimating signal parameters at the receiver is needed to provide efficient demodulation of M-QAM and Q-ASK signals.

SUMMARY

The present invention provides an improved system and method for estimating one or more parameters of a received M-QAM or q-ASK signal, such as amplitude and SNR. A first embodiment of the invention estimates the amplitude of an M-QAM signal based upon known or ascertainable phase information regarding a plurality of transmitted symbols. A respective set of received symbols, corresponding to the plurality of transmitted symbols, is recovered. Each of the plurality of received symbols is multiplied by a complex unit vector with a phase that is opposite in sign to the complex transmitted data symbol to generate a set of products. The set of products is summed, and the real part of the sum of products is then determined. The absolute values of the known transmitted symbols are summed to generate a total magnitude value. The real part of the sum of products is divided by the sum of transmitted magnitude values to generate an estimate of the amplitude of the M-QAM signal.

A second embodiment of the invention estimates the amplitude of a q-ASK signal at a receiver based upon known or ascertainable magnitude information regarding a plurality of transmitted symbols. A respective set of N received samples corresponding to the transmitted symbols is recovered. For each of the N samples, the sample is multiplied by the corresponding sign of the transmitted symbol to generate a set of products. This set of products is then summed to generate a first sum. The absolute values of the transmitted symbols are then summed to generate a second sum. The first sum is divided by the second sum to generate an estimated amplitude for the q-ASK signal.

A third embodiment of the invention estimates the amplitude of an M-QAM or q-ASK signal with no assumed knowledge of the specific transmitted data symbols. Only statistical knowledge of the amplitude of the transmitted data symbols is assumed. A respective set of received samples corresponding to the transmitted symbols is recovered. The absolute values of the received samples are determined and summed to generate a first sum. The mean of the absolute values of the amplitudes of transmitted symbols is determined and then multiplied by the total number of received symbols to generate a product. The first sum is divided by the product to generate an estimated amplitude for the M-QAM or q-ASK signal.

Other embodiments of the present invention utilize second-order and fourth-order moments of received samples, a maximum likelihood searching process, or a Kurtosis estimation process to estimate amplitude, noise power, and signal-to-noise ratio of a received signal.

BRIEF DESCRIPTION OF THE DRAWING(S)

FIGS. 7A and 7B are a flow diagram of a Kurtosis estimation process for estimating the signal-to-interference ratio of an M-QAM or q-ASK signal using second-order and fourth-order moments of received samples, pursuant to a seventh embodiment of the invention.

DETAILED DESCRIPTION OF THE PREFERRED EMBODIMENT(S)

Improved systems and methods are disclosed for estimating one or more parameters of a received M-QAM or q-ASK signal, such as amplitude and signal-to-noise ratio. A first embodiment of the invention is a method 100 which estimates the amplitude of an M-QAM signal based upon known or ascertainable phase information concerning a plurality of transmitted symbols ($d_k$). If the receiver has knowledge of the transmitted M-QAM symbols $d_k$, for example in systems employing pilot signals, this information may be used to estimate the amplitude, A, as:

$$\hat{A} = \frac{\text{Re}\left(\sum_{k=1}^{N} r_k \exp[-j\theta(d_k)]\right)}{\sum_{k=1}^{N} |d_k|};$$

Equation (2)

where $\theta(d_k)$ is the phase of complex symbol $d_k$ and N is the number of received symbols being processed. Re( ) represents the Real operator, noting that one may substitute many other operators without substantively changing the invention.

Figure 1:
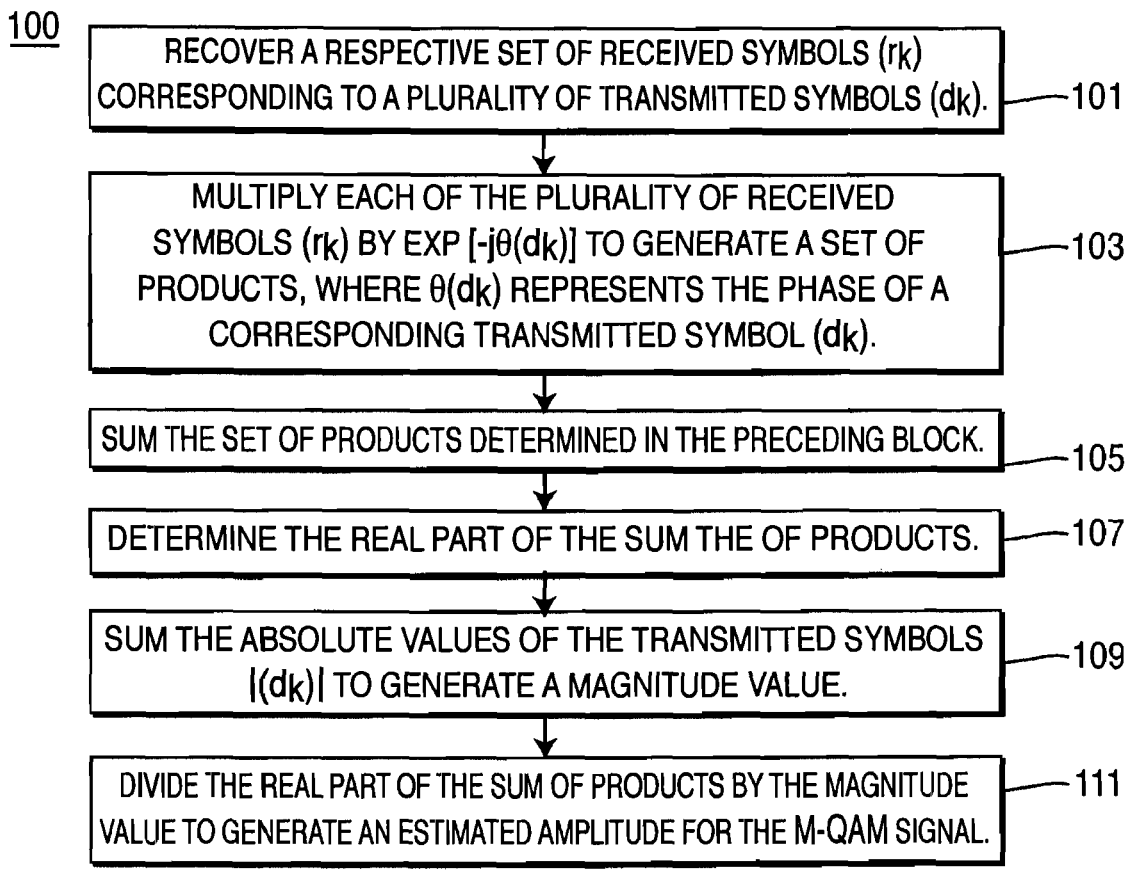
FIG. 1 is a flow diagram of a procedure for estimating the amplitude of an M-QAM signal based upon known or ascertainable phase information concerning a plurality of transmitted symbols, according to a first embodiment of the invention.

More specifically, referring to FIG. 1, a respective set of received symbols ($r_k$), corresponding to the plurality of transmitted symbols, is recovered (step 101). Each of the plurality of received symbols ($r_k$) is multiplied by $\exp[-j\theta(d_k)]$ to generate a set of products (step 103), where $\theta(d_k)$ represents the phase of a corresponding transmitted symbol ($d_k$). The set of products is summed (step 105), and the real part of the sum of products is then determined (step 107). The absolute values of the transmitted symbols $|(d_k)|$ are summed to generate a magnitude value (step 109). The real part of the sum of products is divided by the magnitude value to generate an estimated amplitude for the M-QAM signal (step 111).

A second embodiment of the invention is a method 200 which estimates the amplitude of a q-ASK signal at a receiver based upon known or ascertainable magnitude information regarding a plurality of transmitted symbols ($d_k$). If $d_k$ is q-ASK signal, then amplitude estimation may proceed in accordance with the following equation:

$$\hat{A} = \frac{\sum_{k=1}^{N} y_k \text{sign}(d_k)}{\sum_{k=1}^{N} |d_k|}.$$

Equation (3)

Figure 2:
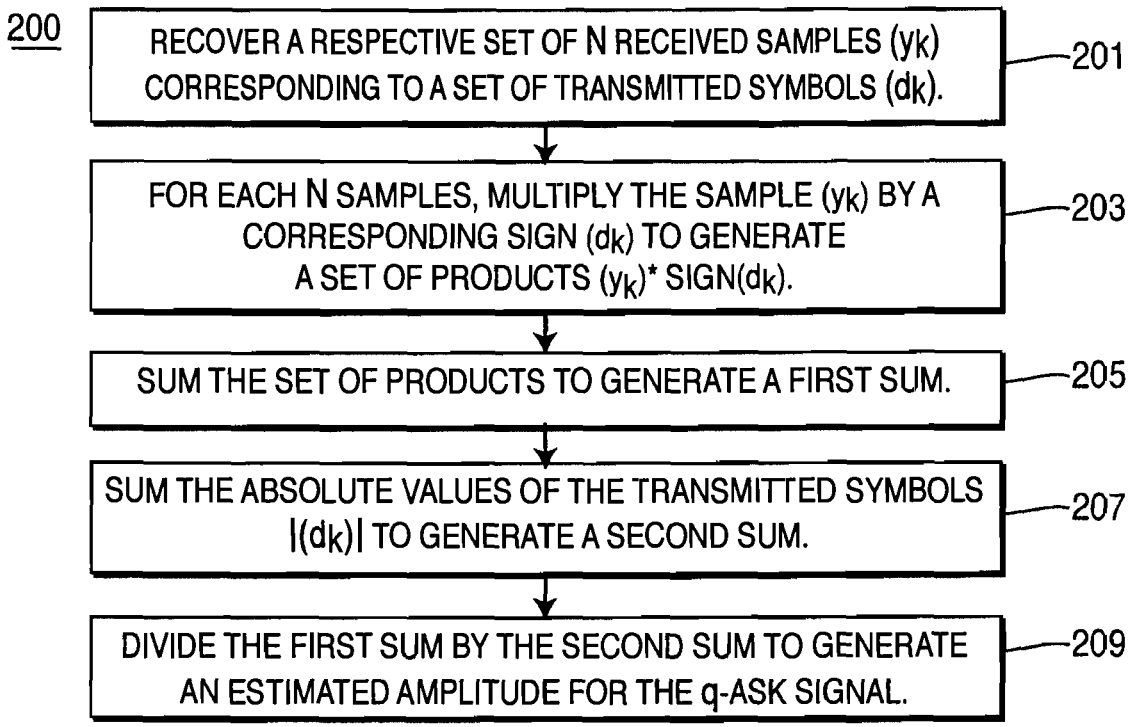
FIG. 2 is a flow diagram of a process for estimating the amplitude of a q-ASK signal at a receiver based upon known or ascertainable magnitude information regarding a plurality of transmitted symbols, pursuant to a second embodiment of the invention.

With reference to FIG. 2, a respective set of N received samples ($y_k$) corresponding to the transmitted symbols ($d_k$) is recovered (step 201). For each of the N samples, the sample ($y_k$) is multiplied by a corresponding sign ($d_k$) to generate a set of products ($y_k$)*sign($d_k$) (step 203). This set of products is then summed to generate a first sum (step 205). The absolute values of the transmitted symbols $|(d_k)|$ are then summed to generate a second sum (step 207). The first sum is divided by the second sum to generate an estimated amplitude for the q-ASK signal (step 209).

A third embodiment of the invention is a method 300 which uses absolute values to estimate the amplitude of an M-QAM or q-ASK signal which includes a set of N transmitted symbols ($d_k$), where N is a positive integer greater than one. In many cases, the receiver lacks information about the transmitted symbols $d_k$, such as the phases and magnitudes of the symbols. Accordingly, the amplitudes of the received samples may be utilized to generate an amplitude estimate for both M-QAM and q-ASK signals from the relationship:

$$\hat{A} = \frac{\sum_{k=1}^{N} |y_k|}{N * E|d_k|};$$

Equation (4)

where $E|d_k|$ is the mean of the amplitude of signal $d_k$ and may be computed theoretically or empirically. For example, for 4-ASK modulation with $$d_k \in \left\{\pm\frac{1}{2}, \pm\frac{3}{2}\right\}$$

with equal probability, $E|d_k|=1$, the amplitude estimate is:

$$\hat{A} = \frac{1}{N}\sum_{k=1}^{N} |y_k|.$$

Equation (5)

Figure 3:
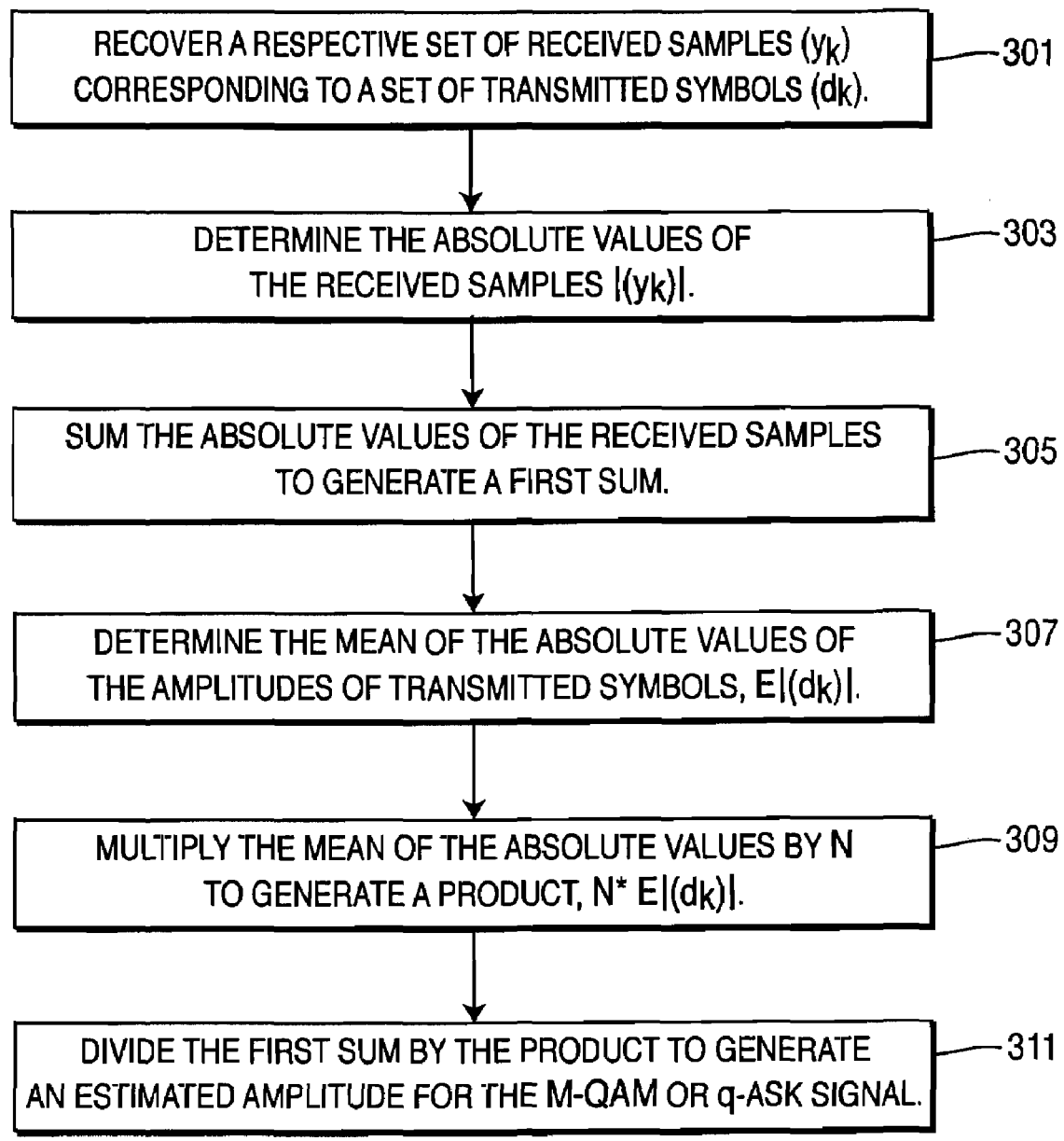
FIG. 3 is a flow diagram of a procedure for using absolute values of received samples to estimate the amplitude of an M-QAM or q-ASK signal, pursuant to a third embodiment of the invention.

With reference to FIG. 3, a respective set of received samples ($y_k$) corresponding to the transmitted symbols ($d_k$) is recovered (step 301). The absolute values of the received samples $|(y_k)|$ are determined (step 303) and summed (step 305) to generate a first sum. The mean of the absolute values of the amplitudes of transmitted symbols, $E|(d_k)|$, is determined (step 307) and then multiplied by N to generate a product, $N*E|(d_k)|$ (step 309). The first sum is divided by the product to generate an estimated amplitude for the M-QAM or q-ASK signal (step 311).

Through the use of second-order and fourth-order moments of received samples, a method 400 of a fourth embodiment of the invention estimates the amplitude, noise power, and signal-to-noise ratio of an M-QAM signal that includes a set of transmitted symbols ($d_k$). The noise at the receiver takes the form, $n_k = n_k^R + jn_k^I$, where $n_k^R$ and $n_k^I$ can be approximated as two independent Gaussian variables with zero means and same variance $\sigma_r^2$, $E|n_k|^2 = 2\sigma^2$, which is often exact, or at least a good approximation. The amplitude is estimated as:

$$\hat{A} = \sqrt[4]{\frac{2(E|r_k|^2)^2 - E|r_k|^4}{2(E|d_k|^2)^2 - E|d_k|^4}}.$$ Equation (6)

The noise power is estimated as:

$$\hat{\sigma}_n^2 = E|r_k|^2 - \hat{A}^2 E|d_k|^2.$$ Equation (7)

Using the above two Equations (6) and (7), the SNR is estimated as:

$$SNR = \hat{A}^2 E|d_k|^2 / \hat{\sigma}_n^2.$$ Equation (8)

Figure 4:
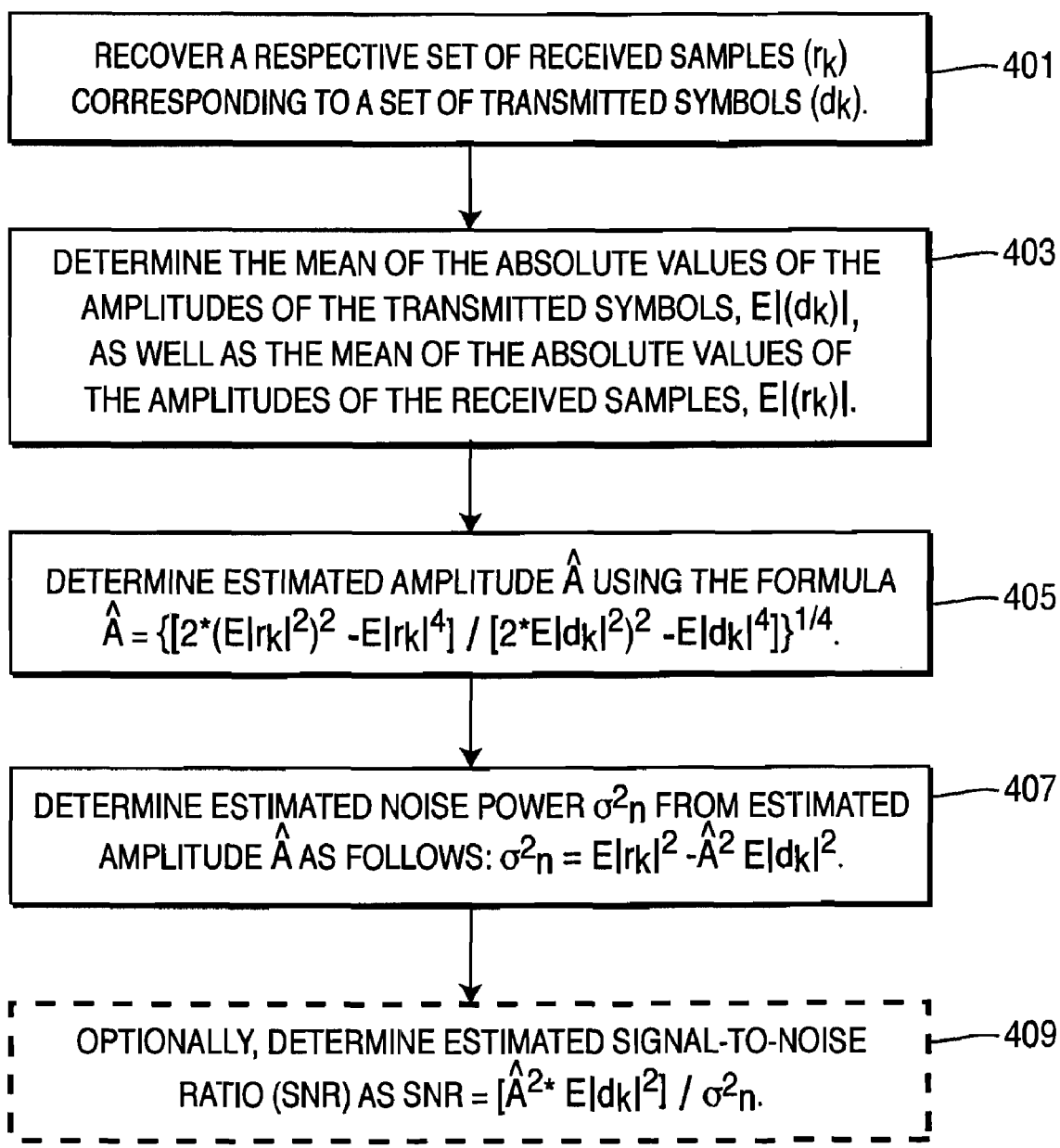
FIG. 4 is a flow diagram of a procedure for using second-order and fourth-order moments of received samples to estimate amplitude, noise power, and signal-to-noise ratio of an M-QAM signal that includes a set of transmitted symbols, pursuant to a fourth embodiment of the invention.

Referring now to FIG. 4, the method 400 begins when a respective set of received samples ($r_k$) corresponding to the transmitted symbols ($d_k$) is recovered (step 401). The mean of the absolute values of the amplitudes of the transmitted symbols, $E|(d_k)|$, as well as the mean of the absolute values of the amplitudes of the received samples, $E|(r_k)|$, are determined (step 403). The estimated amplitude $\hat{A}$ is determined using Equation 6 (step 405). Estimated noise power $\sigma_n^2$ is determined from estimated amplitude $\hat{A}$ using equation 7 (step 407). Optionally, estimated SNR is then determined using Equation 8 (step 409)).

Through the use of second-order and fourth-order moments of received samples, a method 500 of a fifth embodiment of the invention estimates amplitude, noise power, and SNR of a q-ASK signal that includes a set of transmitted symbols ($d_k$). When a real q-ASK signal is transmitted, the second and fourth order moments may be used to estimate the signal amplitude and power as:

$$\hat{A} = \sqrt[4]{\frac{3(E(r_k^2))^2 - E(r_k^4)}{3(E(d_k^2))^2 - E(d_k^4)}};$$ Equation (9)

and $$\hat{A}^2 = \sqrt{\frac{3(E(r_k^2))^2 - E(r_k^4)}{3(E(d_k^2))^2 - E(d_k^4)}}.$$ Equation (10)

The noise power is estimated as:

$$\hat{\sigma}_n^2 = E(r_k^2) - \hat{A}^2 E(d_k^2).$$ Equation (11)

Using Equations (10) and (11), the SNR is estimated as:

$$SNR = \hat{A}^2 E(d_k^2) / \hat{\sigma}_n^2.$$ Equation (12)

Expectations involving $d_k$ may be computed empirically or theoretically. For example, for 4-ASK modulation $E(d_k^2) = 1.25$ and $E(d_k^4) = 2.5625$. The signal amplitude and power may be estimated by substitution with the determined values e.g., $$\hat{A} = \sqrt[4]{\frac{3(E(r_k^2))^2 - E(r_k^4)}{2.125}} \text{ and } \hat{A}^2 = \sqrt{\frac{3(E(r_k^2))^2 - E(r_k^4)}{2.125}},$$

respectively. The SNR is estimated by using Equation (12). Various methods for generating estimates of the expectations involving $r_k$ may be used.

Figure 5:
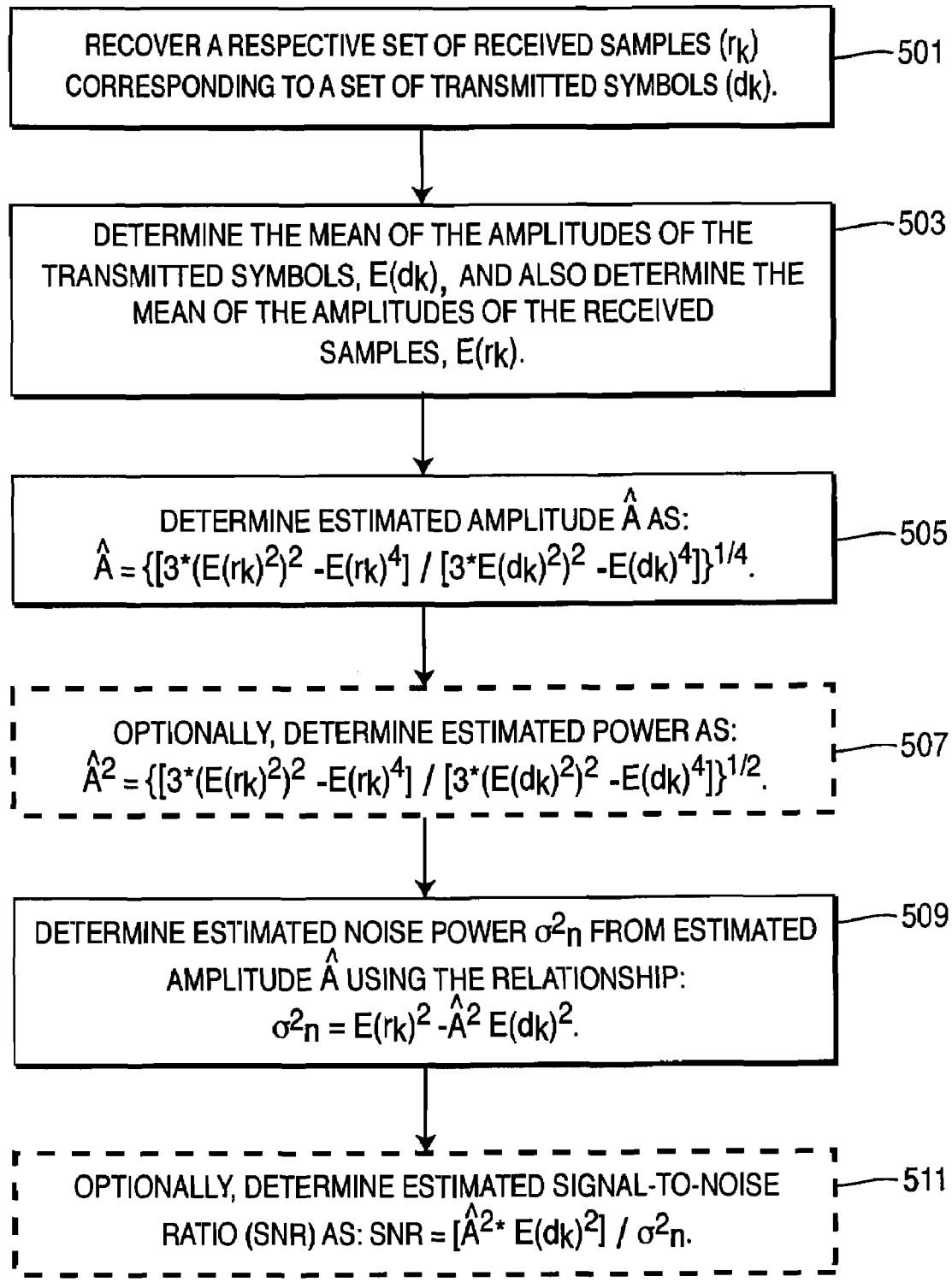
FIG. 5 is a flow diagram of a procedure for using second-order and fourth-order moments of received samples to estimate amplitude, noise power, and signal-to-noise ratio of a q-ASK signal that includes a set of transmitted symbols, pursuant to a fifth embodiment of the invention.

With reference to FIG. 5, the method 500 begins when a respective set of received samples ($r_k$) corresponding to the transmitted symbols ($d_k$) is recovered (step 501). The mean of the amplitudes of the transmitted symbols, $E(d_k)$, as well as the mean of the amplitudes of the received samples, $E(r_k)$, are determined (step 503). Estimated amplitude $\hat{A}$ is determined using Equation 9 (step 505). Optionally, estimated power is determined using Equation 10 (step 507). Estimated noise power $\sigma_n^2$ is determined from estimated amplitude $\hat{A}$ using Equation 11 (step 509). Optionally, estimated SNR may then determined using Equation 12 (step 511).

Using a maximum likelihood searching process, a method 600 of a sixth embodiment of the invention estimates at least one of the amplitude, noise power, and signal-to-noise ratio of a q-ASK or M-QAM signal that includes a set of transmitted symbols ($d_k$). Assuming the received samples are sufficiently independent, the joint probability density function of $r_1$, $r_2$, ..., $r_N$ may be assumed to be the product of the marginal distributions of $r_k$, that is:

$$f(A, \sigma_n; r_1, r_2, \ldots, r_N) = \prod_{k=1}^{N} f(A, \sigma_n; r_k);$$ Equation (13)

where $\theta(A, \sigma_n; r_k)$ is an estimate of the density of $r_k$. The goal of the maximum-likelihood amplitude estimator is to find the amplitude, $\hat{A}$, that maximizes the joint probability density function as shown by Equation (13), i.e.:

$$\hat{A} = \arg\max_{A} f(A, \sigma_n; r_1, r_2, \ldots, r_N).$$ Equation (14)

The following search algorithm finds the maximum likelihood estimate for amplitude, and optionally for noise power and SNR: First, the received vector $r_k$ is normalized such that its average power is unity, $$\left(\text{i.e. } \frac{1}{N} \sum_{k=1}^{N} |r_k|^2 = 1.\right)$$

$A_{min}$ and $A_{max}$ are selected according to the minimum and maximum SNR over which to search as follows:

$$A_{min} = \sqrt{\frac{SNR_{min}}{1 + SNR_{min}}}; \text{ and}$$ Equation (15)

$$A_{max} = \sqrt{\frac{SNR_{max}}{1 + SNR_{max}}}.$$ Equation (16)

The amplitude search step size Δ is selected such that it achieves the desired amplitude resolution. Next, $A_k = A_{min} + k\Delta$ is determined, where $0 \leq k \leq K$ and $$K = \frac{A_{max} - A_{min}}{\Delta}.$$

For each amplitude $A_k$, a corresponding noise power is determined as:

$$\sigma_n^2 = 1 - E|d_k|^2 A_k^2. \qquad \text{Equation (17)}$$

The joint probability density function $f(A_k, \sigma_n; r_1, r_2, \ldots, r_N)$ is calculated for each $A_k$. The value $A_k$ that corresponds to the maximum joint PDF, (i.e., $$\hat{A} = \underset{A_k; k \in \{1,2,\ldots,K\}}{\operatorname{argmax}} f(A_k, \sigma_n; r_1, r_2, \ldots, r_N)),$$

is searched for, and then $\hat{A}$ is the estimated amplitude.

Additionally, (and optionally,) a value for the estimated noise power can be determined from the estimated amplitude $\hat{A}$ as the total power less the product of the amplitude estimate squared and the expected data symbol power, (i.e., $\sigma_n^2 = E(r_k)^2 - \hat{A}^2 E(d_k)^2$). Optionally, a value for the estimated SNR can be determined by taking the ratio of the estimated signal power and the estimated noise power, (i.e., from the relationship $SNR = [\hat{A}^2 * E(d_k)^2]/\sigma_n^2$)

Figure 6A:
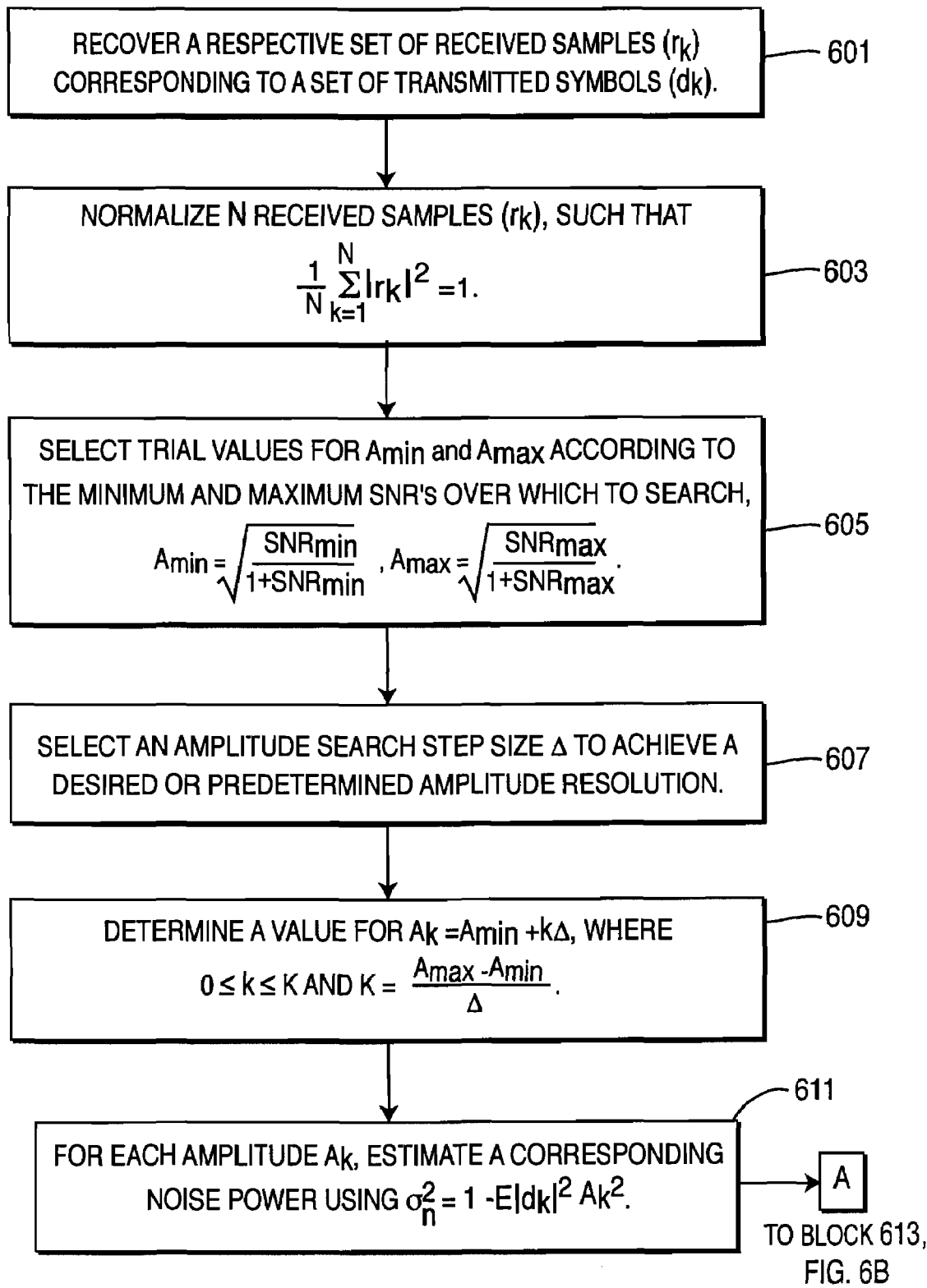
FIGS. 6A, 6B and 6C are a flow diagram of a procedure for using a maximum likelihood searching process to estimate the amplitude, noise power, and signal-to-noise ratio of a q-ASK or M-QAM signal that includes a set of transmitted symbols, pursuant to a sixth embodiment of the invention.
Figure 6B:
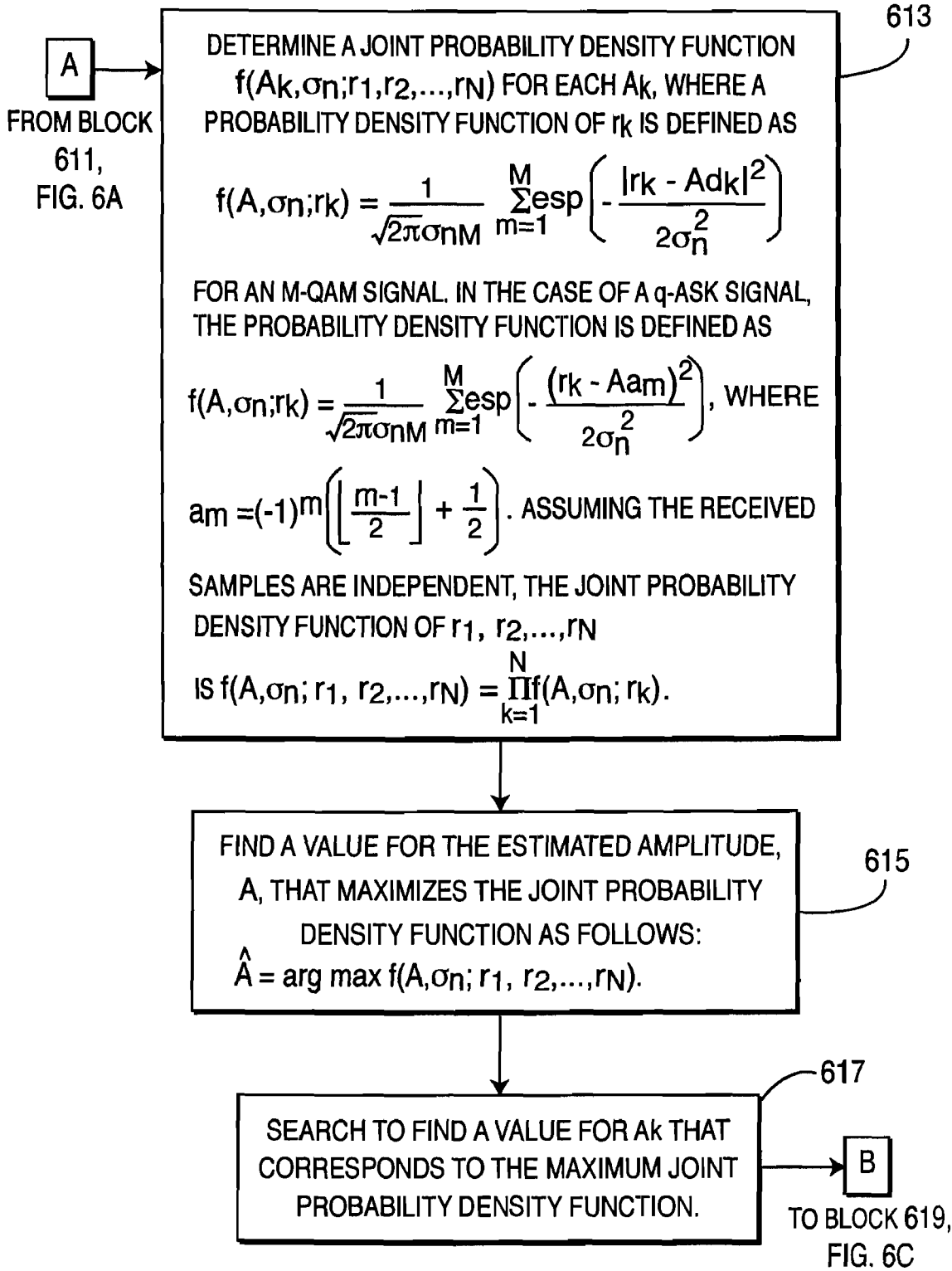
Figure 6C:
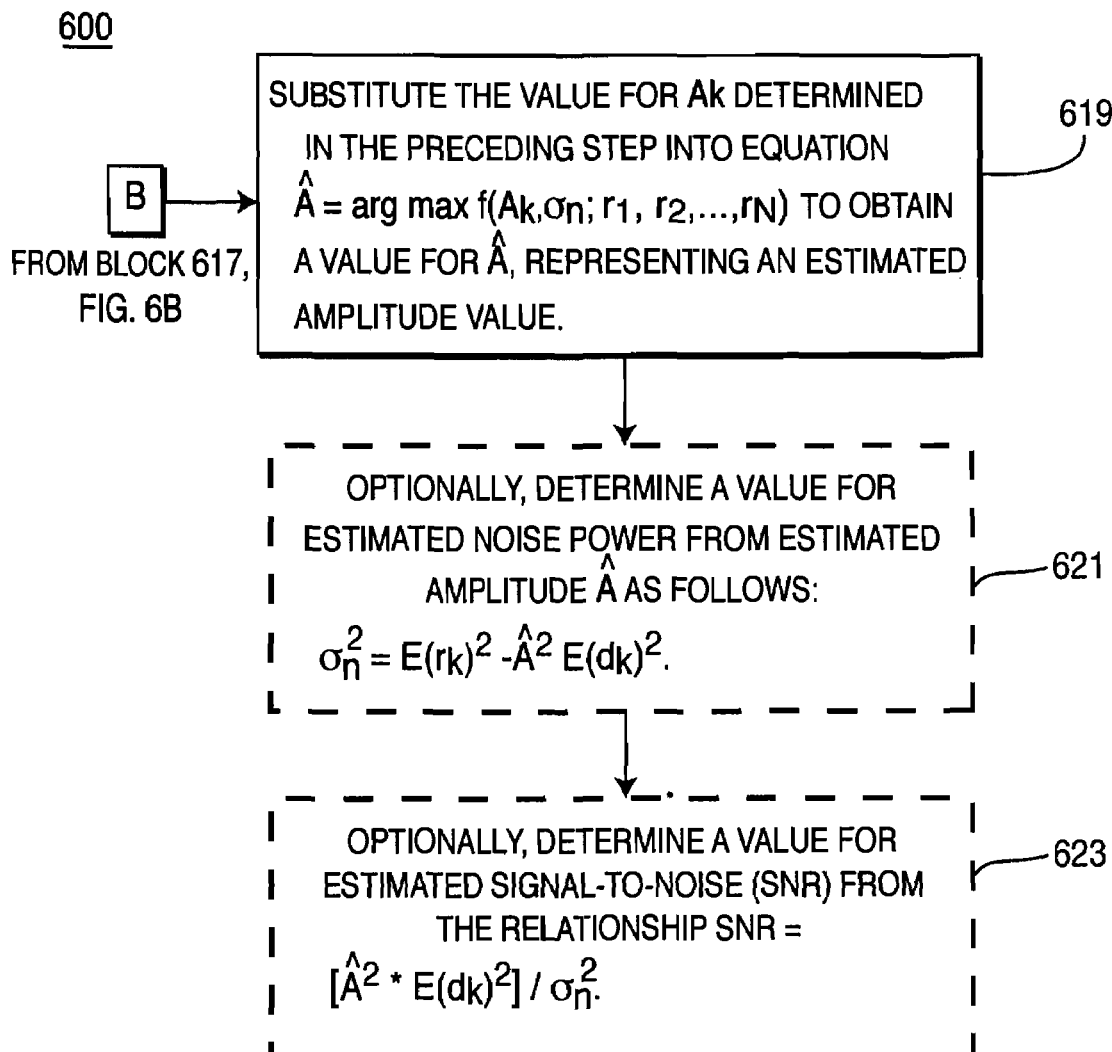

With reference to FIGS. 6A, 6B and 6C, the method 600 briefly described in the foregoing paragraphs is described in greater detail. A respective set of received samples ($r_k$) corresponding to the transmitted symbols ($d_k$) is recovered (step 601). N received samples ($r_k$) are normalized, (N being a positive integer greater than one), such that $$\frac{1}{N} \sum_{k=1}^{N} |r_k|^2 = 1 \text{(step 603)}.$$

Trial values for $A_{min}$ and $A_{max}$ are selected according to the minimum and maximum SNRs over which to search using Equation 15 and 16 (step 605).

An amplitude search step size Δ is selected to achieve a desired or predetermined amplitude resolution (step 607). Next, a value for $A_k = A_{min} + k\Delta$ is determined, where $0 \leq k \leq K$ and $$K = \frac{A_{max} - A_{min}}{\Delta} \text{(step 609)}.$$

For each amplitude $A_k$, a corresponding noise power is then estimated using Equation 17 (step 611).

A joint probability density function $\theta(A_k, \sigma_n; r_1, r_2, \ldots, r_N)$ is then determined for each $A_k$ (step 613).

For both M-QAM and q-ASK signals, a main objective of the maximum-likelihood searching process is to find a value for the estimated amplitude, A, that maximizes the joint probability density function using Equation 14 (step 615). At step 617, a search is conducted to find a value for $A_k$ that corresponds to the maximum joint probability density function. This value for $A_k$ is substituted into the Equation $$\hat{A} = \underset{A_k; k \in \{1,2,\ldots,K\}}{\operatorname{argmax}} f(A_k, \sigma_n; r_1, r_2, \ldots, r_N)$$

to obtain a value for $\hat{A}$, representing an estimated amplitude value (step 619).

Optionally, a value for estimated noise power can be determined from the estimated amplitude $\hat{A}$ as the estimated total power less the product of the amplitude estimate squared and the expected data symbol power, (i.e., $\sigma_n^2 = E(r_k)^2 - \hat{A}^2 E(d_k)^2$ (step 621)). Additionally, (and optionally), a value for estimated SNR can be determined as a ratio of the estimated signal power and the estimated noise power, (i.e., $SNR = [\hat{A}^2 * E(d_k)^2]/\sigma_n^2$) (step 623).

Pursuant to a method 700 of a seventh embodiment of the invention, a Kurtosis estimation process estimates the signal-to-noise ratio of an M-QAM or q-ASK signal using second-order and fourth-order moments of received samples ($r_k$). As a first step, the Kurtosis of the noise only ($K_{CG}$) and signal only ($K_{sig}$) present is computed. In this example, complex Gaussian noise is used for illustrative purposes. However, other noise distributions may be assumed and do not deviate substantively from this invention. Expectations involving $d_k$ and $n_k$ may be computed empirically or theoretically, e.g., the Kurtosis values are determined as follows:

$$K_{CG} \equiv \frac{E\{|n_k|^4\}}{E\{|n_k|^2\}^2} = 2; \text{ and} \qquad \text{Equation (18)}$$

$$K_{sig} \equiv \frac{E\{|d_k|^4\}}{E\{|d_k|^2\}^2}; \qquad \text{Equation (19)}$$

where complex, circularly symmetric Gaussian noise is assumed. For example, with QPSK data, $K_{sig} = K_{QPSK} = 1$, for square 16QAM data, $K_{sig} = K_{16QAM} = 1.32$. The $K_{sig}$ parameter for any signal constellation can be readily obtained.

The Kurtosis for rectangular and 'cross' QAM constellations can also be used with this method and determined as outlined above. The Kurtosis may be written in terms of, and solved for the SNR as follows:

$$SNR = \frac{(2 - Kurt(r)) + \sqrt{\frac{(4 - 2K_{M-QAM}) - }{(2 - K_{M-QAM})Kurt(r)}}}{(Kurt(r) - K_{M-QAM})}. \qquad \text{Equation (20)}$$

Any of a variety of Kurtosis estimates or approximations may be used.

Figure 7B:
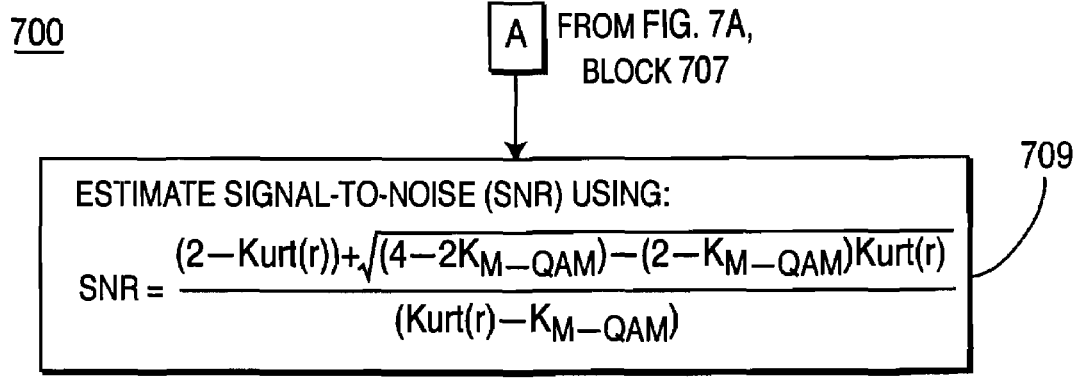

Referring to FIGS. 7A and 7B, a flow diagram of the details of the foregoing Kurtosis process is shown. As a preliminary matter, the second-order moment is defined as $E\{|r_k|^2\} = E\{|n_k|^2\} + E\{|d_k|^2\}$, and the fourth-order moment is defined as $E\{|r_k|^4\} = E\{|n_k|^4\} + E\{|d_k|^4\} + 4E\{|n_k|^2\}E\{|d_k|^2\}$, where $d_k$ denotes the transmitted symbols and $n_k$ denotes a noise component that is recovered with the received samples $r_k$ (step 701). At step 703, the fourth-order moment is divided by the second-order moment so as to implement a Kurtosis operation as follows:

$$Kurt(r) \equiv \frac{E\{|r_k|^4\}}{E\{|r_k|^2\}^2} \quad \text{Equation (21)}$$

$$= \frac{E\{|d_k|^4\} + E\{|n_k|^4\} + 4E\{|d_k|^2\}E\{|n_k|^2\}}{E\{|d_k|^2\}^2 + E\{|n_k|^2\}^2 + 2E\{|d_k|^2\}E\{|n_k|^2\}}.$$

In order to estimate the SNR, it is necessary to determine the Kurtosis attributable to noise alone (step 705). For example, assuming the complex circularly symmetric Gaussian noise, the Kurtosis of the noise alone is determined using Equation 18. The Kurtosis attributable to the signal alone, ($K_{sig}$), is determined using Equation 19 (step 707). For example, with QPSK data, $K_{sig}=K_{QPSK}=1$ may be used. For square 16QAM data, $K_{sig}=K_{16QAM}=1.32$ may be used. For high order modulation, square M-QAM, the signal Kurtosis $K_{sig}$ approaches that of the square complex uniform distribution:

$$\lim_{M \to \infty} (K_{M-QAM}) = 1.4.$$

However, use of a square constellation is not required, since the Kurtosis for rectangular and 'cross' QAM constellations can also be utilized in conjunction with this method and pre-computed in the same way.

Once an appropriate value for $K_{sig}$ (e.g., $K_{M-QAM}$ in the case of a M-QAM signal) is determined, the method 700 of FIG. 7 advances to step 709 where the signal-to-noise ratio (SNR) is estimated using Equation 20.

What is claimed is:

1. A receiver configured to demodulate M-ary quadrature amplitude modulation (M-QAM) signals by estimating the amplitude of a received M-QAM signal based upon known phase information of a plurality of transmitted symbols ($d_k$), the receiver comprising:
   a processor configured to:
      recover a respective set of received symbols ($r_k$) corresponding to the plurality of transmitted symbols ($d_k$);
      generate a set of products based on the received symbols ($r_k$);
      sum the set of products;
      determine the real part of the sum of products;
      sum the absolute values of the transmitted symbols $|(d_k)|$ to generate a magnitude value; and
      generate the estimated amplitude of the received M-QAM signal by dividing the real part of the sum of products by the magnitude value.

2. The receiver of claim 1 wherein the processor is configured to generate the set of products by multiplying each of the plurality of received symbols ($r_k$) by exp $[-j\theta(d_k)]$, wherein $\theta(d_k)$ represents the phase of a corresponding transmitted symbol ($d_k$).

3. A receiver configured to demodulate M-ary quadrature amplitude modulation (M-QAM) signals by estimating the amplitude of a received M-QAM signal based upon known phase information of a plurality of transmitted symbols ($d_k$), the receiver comprising:
   a processor configured to:
      recover a respective set of N received samples ($y_k$) corresponding to the transmitted symbols ($d_k$);
      for each of the N samples, multiply the sample ($y_k$) by a corresponding sign ($d_k$) to generate a set of products ($y_k$)*sign($d_k$);
      sum the set of products to generate a first sum;
      sum the absolute values of the transmitted symbols $|(d_k)|$ to generate a second sum; and
      generate the estimated amplitude of the q-ASK signal by dividing the first sum by the second sum.

4. A receiver configured to demodulate signals by estimating the amplitude of a received signal which includes a set of N transmitted symbols ($d_k$), where N is a positive integer greater than one, the receiver comprising:
   a processor configured to:
      recover a respective set of N received samples ($y_k$) corresponding to the transmitted symbols ($d_k$);
      determine the absolute values of the received samples $|(y_k)|$;
      sum the absolute values to generate a first sum;
      determine the mean of the absolute values of the amplitudes of transmitted symbols, $E|(d_k)|$;
      multiply the mean of the absolute values by N to generate a product, $N*E|(d_k)|$; and
      generate the estimated amplitude of the received signal by dividing the first sum by the product.

5. The receiver of claim 4, wherein the received signal is an M-ary quadrature amplitude modulation (M-QAM) signal.

6. The receiver of claim 4, wherein the received signal is a q-ary amplitude shift keying (q-ASK) signal.

7. A receiver configured to demodulate M-ary quadrature amplitude modulation (M-QAM) signals by estimating the amplitude of a received M-QAM signal that includes a set of transmitted symbols ($d_k$), the receiver comprising:
   a processor configured to:
      recover a respective set of received samples ($r_k$) corresponding to the transmitted symbols ($d_k$);
      determine the mean of the absolute values of the amplitudes of the transmitted symbols, $E|(d_k)|$;
      determine the mean of the absolute values of the amplitudes of the received samples, $E|(r_k)|$; and
      estimate the amplitude of the received M-QAM signal $\hat{A}$ as:

$$\hat{A} = \{[2*(E|r_k|^2)^2 - E|r_k|^4]/[2*(E|d_k|^2)^2 - E|d_k|^4]\}^{1/4}.$$

8. A receiver configured to demodulate M-ary quadrature amplitude modulation (M-QAM) signals by estimating the noise power of a received M-QAM signal that includes a set of transmitted symbols ($d_k$), the receiver comprising:
   a processor configured to:
      recover a respective set of received samples ($r_k$) corresponding to the transmitted symbols ($d_k$);
      determine the mean of the absolute values of the amplitudes of the transmitted symbols, $E|(d_k)|$;
      determine the mean of the absolute values of the amplitudes of the received samples, $E|(r_k)|$;
      estimate amplitude of the received M-QAM signal $\hat{A}$ as:

$$\hat{A} = \{[2*(E|r_k|^2)^2 - E|r_k|^4]/[2*(E|d_k|^2)^2 - E|d_k|^4]\}^{1/4}; \text{ and}$$

estimate noise power of the received M-QAM signal $\sigma^2_n$ as:

$$\sigma^2_n = E|r_k|^2 - \hat{A}^2 E|d_k|^2.$$

9. A receiver configured to demodulate M-ary quadrature amplitude modulation (M-QAM) signals by estimating the signal-to-noise ratio (SNR) of a received M-QAM signal that includes a set of transmitted symbols ($d_k$), the receiver comprising:
   a processor configured to:
      recover a respective set of received samples ($r_k$) corresponding to the transmitted symbols ($d_k$);

determine the mean of the absolute values of the amplitudes of the transmitted symbols, $E|d_k|$;

determine the mean of the absolute values of the amplitudes of the received samples, $E|r_k|$;

estimate amplitude of the received M-QAM signal $\hat{A}$ as:

$\hat{A} = \{[2*(E|r_k|^2)^2 - E|r_k|^4]/[2*(E|d_k|^2)^2 - E|d_k|^4]\}^{1/4}$;

estimate noise power of the received M-QAM signal $\sigma_n^2$ as:

$\sigma_n^2 = E|r_k|^2 - \hat{A}^2 E|d_k|^2$; and estimate SNR of the received M-QAM signal as:

$SNR = [\hat{A}^2 * E|d_k|^2]/\sigma_n^2$.

10. A receiver configured to demodulate q-ary amplitude shift keyeing (q-ASK) signals by estimating the amplitude of a received q-ASK signal that includes a set of transmitted symbols ($d_k$), the receiver comprising:

a processor configured to:

recover a respective set of received samples ($r_k$) corresponding to the transmitted symbols ($d_k$);

determine second and fourth order moments of the transmitted symbols, $E(d_k^2)$ and $E(d_k^4)$;

determine second and fourth order moments of the received samples, $E(r_k^2)$ and $E(r_k^4)$; and estimate amplitude of the received q-ASK signal $\hat{A}$ as:

$\hat{A} = \{[3*(E(r_k^2))^2 - E(r_k^4)]/[3*(E(d_k^2))^2 - E(d_k^4)]\}^{1/4}$.

11. A receiver configured to demodulate q-ary amplitude shift keyeing (q-ASK) signals by estimating the power of a received q-ASK signal that includes a set of transmitted symbols ($d_k$), the receiver comprising:

a processor configured to:

recover a respective set of received samples ($r_k$) corresponding to the transmitted symbols ($d_k$);

determine second and fourth order moments of the transmitted symbols, $E(d_k^2)$ and $E(d_k^4)$;

determine second and fourth order moments of the received samples, $E(r_k^2)$ and $E(r_k^4)$; and estimate power of the received q-ASK signal as:

$\hat{A}^2 = \{[3*(E(r_k^2))^2 - E(r_k^4)]/[3*(E(d_k^2))^2 - E(d_k^4)]\}^{1/2}$.

12. A receiver configured to demodulate q-ary amplitude shift keyeing (q-ASK) signals by estimating the noise power of a received q-ASK signal that includes a set of transmitted symbols ($d_k$), the receiver comprising:

a processor configured to:

recover a respective set of received samples ($r_k$) corresponding to the transmitted symbols ($d_k$);

determine second and fourth order moments of the transmitted symbols, $E(d_k^2)$ and $E(d_k^4)$;

determine second and fourth order moments of the received samples, $E(r_k^2)$ and $E(r_k^4)$;

estimate amplitude $\hat{A}$ as:

$\hat{A} = \{[3*(E(r_k^2))^2 - E(r_k^4)]/[3*(E(d_k^2))^2 - E(d_k^4)]\}^{1/4}$; and estimate noise power of the received q-ASK signal $\sigma_n^2$ from the estimated amplitude $\hat{A}$ as: $\sigma_n^2 = E(r_k^2) - \hat{A}^2 E(d_k^2)$.

13. A receiver configured to demodulate q-ary amplitude shift keyeing (q-ASK) signals by estimating the signal-to-noise ratio (SNR) of a received q-ASK signal that includes a set of transmitted symbols ($d_k$), the receiver comprising:

a processor configured to:

recover a respective set of received samples ($r_k$) corresponding to the transmitted symbols ($d_k$);

determine second and fourth order moments of the transmitted symbols, $E(d_k^2)$ and $E(d_k^4)$;

determine second and fourth order moments of the received samples, $E(r_k^2)$ and $E(r_k^4)$;

estimate amplitude $\hat{A}$ as:

$\hat{A} = \{[3*(E(r_k^2))^2 - E(r_k^4)]/[3*(E(d_k^2))^2 - E(d_k^4)]\}^{1/4}$;

estimating noise power $\sigma_n^2$ as: $\sigma_n^2 = E(r_k^2) - \hat{A}^2 E(d_k^2)$; and estimate SNR of the q-ASK signal as: $SNR = [\hat{A}^2 * E(d_k^2)]/\sigma_n^2$.

14. A receiver configured to demodulate M-ary quadrature amplitude modulation (M-QAM) and q-ary amplitude shift keyeing (q-ASK) signals by estimating the signal-to-noise ratio (SNR) of a received M-QAM or q-ASK signal from second-order and fourth-order moments of received samples ($r_k$), wherein the second-order moment is defined as $E\{|r_k|^2\} = E\{|n_k|^2\} + E\{|d_k|^2\}$, and the fourth-order moment is defined as $E\{|r_k|^4\} = E\{|n_k|^4\} + E\{|d_k|^4\} + 4E\{|n_k|^2\}E\{|d_k|^2\}$, where $d_k$ denotes the transmitted symbols and $n_k$ denotes a noise component that is recovered with the received samples $r_k$; the receiver comprising:

a processor configured to:

divide the fourth-order moment by the second-order moment so as to implement a Kurtosis operation as:

$$Kurt(r) \equiv \frac{E\{|r_k|^4\}}{E\{|r_k|^2\}^2}$$
$$= \frac{E\{|d_k|^4\} + E\{|n_k|^4\} + 4E\{|d_k|^2\}E\{|n_k|^2\}}{E\{|d_k|^2\}^2 + E\{|n_k|^2\}^2 + 2E\{|d_k|^2\}E\{|n_k|^2\}},$$

wherein the foregoing expression for Kurtosis includes a first Kurtosis component attributable to received signal, and a second Kurtosis component corresponding to received noise;

determine the first Kurtosis component attributable to the signal alone, ($K_{sig}$), as:

$$K_{sig} \equiv \frac{E\{|d_k|^4\}}{E\{|d_k|^2\}^2};$$

and estimate the signal-to-noise ratio (SNR) of the received M-QAM or q-ASK signal as:

$$SNR = \frac{(2 - Kurt(r)) + \sqrt{(4 - 2K_{sig}) - (2 - K_{sig})Kurt(r)}}{(Kurt(r) - K_{sig})}.$$

15. A base station comprising the receiver of claim 1.

16. A wireless transmit/receive unit (WTRU) comprising the receiver of claim 1.

* * * * *